United States Patent [19]

Mandrin

[11] 4,213,953
[45] Jul. 22, 1980

[54] PROCESS FOR THE PREPARATION OF AMMONIA AND HEAVY WATER

[75] Inventor: Charles Mandrin, Winterthur, Switzerland

[73] Assignee: Sulzer Brothers Limited, Winterthur, Switzerland

[21] Appl. No.: 796,170

[22] Filed: May 12, 1977

[30] Foreign Application Priority Data

May 13, 1976 [CH] Switzerland .................. 6020/76

[51] Int. Cl.² .............................................. C01C 1/04
[52] U.S. Cl. .................... 423/359; 422/159; 422/187; 423/580; 423/648 A
[58] Field of Search .............. 423/359, 360, 351, 361, 423/362, 580 H, 648 A

[56] References Cited

U.S. PATENT DOCUMENTS

| | | | |
|---|---|---|---|
| 2,180,206 | 11/1939 | Honnef | 208/10 |
| 3,215,503 | 11/1965 | Nessler | 423/351 |
| 3,705,009 | 6/1970 | Daugherty | 423/361 |
| 3,716,623 | 2/1973 | Bancroft | 423/648 A |
| 4,112,062 | 9/1978 | Spevack | 423/580 H |

FOREIGN PATENT DOCUMENTS 867736  5/1961  United Kingdom ................ 423/580 H

OTHER PUBLICATIONS

Arco e Gas, 1961, II (3-4), pp. 18-29.
Miller, Acetylene, 1965, pp. 260-263, 270-271.
Summers, Scientific American, 1971, vol. 224, No. 3, pp. 157-158.

Primary Examiner—Wayne A. Langel
Attorney, Agent, or Firm—Kenyon & Kenyon

[57] ABSTRACT

In order to replace the electricity required to drive the compressors of the apparatus, the nitrogen-producing means is supplied with a flow of a synthesis gas mixture from the synthesis circuit of the synthesizing plant. This gas mixture is burned with compressed air to form a mixture of water vapor and nitrogen. The water vapor is then condensed in a condensor and separated out for entry into an exchange tower of the monothermal isotope exchanger. The separated nitrogen is supplied together with hydrogen to form the synthesis gas mixture for the synthesizing plant. In addition, a steam circuit is connected with the condensor and has a steam turbine which produces work to drive the compressor for the air and the compressors used to compress the synthesis gas mixture.

2 Claims, 1 Drawing Figure

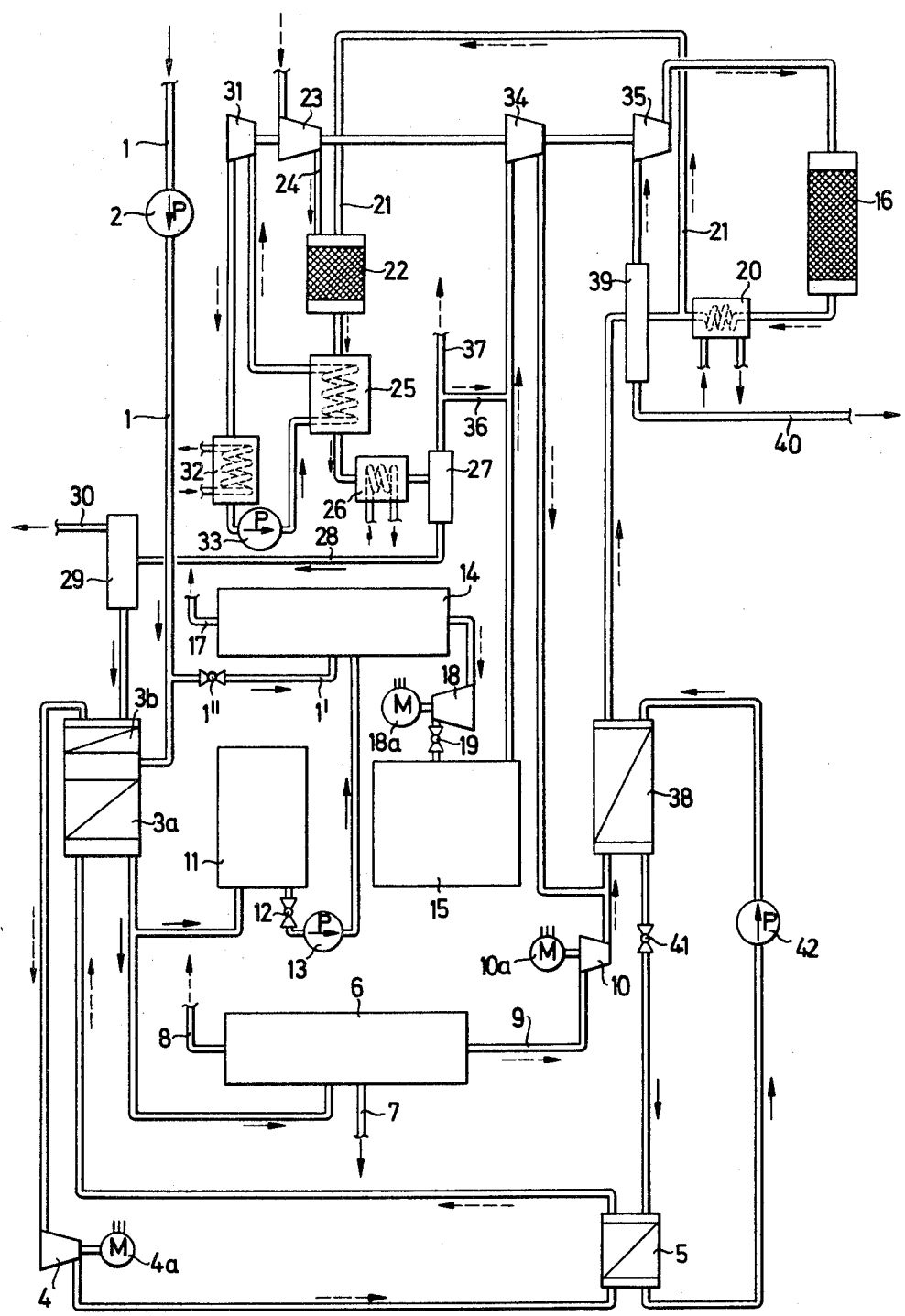

PROCESS FOR THE PREPARATION OF AMMONIA AND HEAVY WATER

This invention relates to an apparatus and process for the preparation of ammonia and heavy water.

As is known, ammonia is usually produced continuously throughout the year in synthesizing plants. Further, in order to reduce the cost associated with such plants, it has been known to combine heavy water preparation plant with the synthesizing plant. Generally, these combined plants use isotope exchange towers to enrich a supply of feed water with deuterium for the production of heavy water as well as an electrolyzer to produce hydrogen for use in the ammonia synthesis.

However, the operation of such plants involves a relatively heavy consumption of electricity. Thus, since electricity is usually more expensive in winter than in summer, when electricity consumption drops considerably, e.g. because there is no need to heat buildings, a suggestion has been made to shut down the electrolyzer during the winter and to have the electrolyzer produce surplus hydrogen in the summer, the surplus being stored to cover the winter consumption of the ammonia synthesizing plant.

Unfortunately, this means that the heavy water production plant is also inoperative in the winter since there is no feed water available for the isotope exchange towers.

Further, each isotope exchange tower and the electrolyzer must be constructed to deal with correspondingly increased throughputs since they are in use for only some, e.g. six months, of each year.

The existing apparatus thus has serious economic disadvantages.

Accordingly, it is an object of the invention to provide a process and apparatus providing continuous production of ammonia and heavy water at reduced electricity consumption costs.

It is another object of the invention to reduce the overall consumption of electricity in an apparatus for the preparation of ammonia and heavy water.

It is another object of the invention to achieve a low-cost operation of a heavy water preparation plant.

It is another object of the invention to improve the deuterium-enrichment of water delivered to a heavy water preparation plant.

Briefly, the invention provides a process and apparatus for the preparation of ammonia and heavy water wherein nitrogen is recovered from the synthesis gas mixture to produce ammonia.

In accordance with the process, a flow of water is enriched with deuterium and a first portion is supplied to a heavy water preparation plant to produce heavy water and hydrogen. A second portion of the deuterium enriched water is also electrically dissociated during the summer to form hydrogen with a portion of the hydrogen being stored during the summer. In addition, some of a synthesis gas mixture is removed from a synthesis circuit of a synthesizing plant and burned, catalytically at least to some extent, with compressed air in order to produce a mixture consisting mainly of water and nitrogen. Thereafter, the water is condensed and separated while the nitrogen is supplied along with the hydrogen from the heavy water preparation plant and the electrolytically produced hydrogen to the synthesis circuit of the synthesizing plant in order to produce ammonia.

In addition, the process includes the steps of storing a portion of the deuterium-enriched water during the winter and of electrolytically dissociating the stored water in the summer to form the hydrogen which is supplied to the synthesis circuit. Also, a portion of the electrolytically dissociated hydrogen is stored during the summer and supplied during the winter to the synthesis circuit.

The apparatus of the invention comprises a monothermal isotope exchanger for enriching water of a natural deuterium operation with deuterium, heavy water preparation plant for preparing heavy water from a portion of the deuterium enriched water and an electrolyzer for electrolytically dissociating water to produce hydrogen. In addition, the apparatus includes a hydrogen storage tank which is selectively connected to the electrolyzer to receive hydrogen produced in the electrolyzer and an ammonia synthesizing plant having a synthesis gas line for receiving a synthesis gas mixture of nitrogen and hydrogen from the heavy water preparation plant and the hydrogen storage tank.

In addition, the apparatus comprises a nitrogen producing means for generating a flow of nitrogen. This means includes a combustor or other suitable combustion facility, a first feed line connected to the combustor to feed compressed air thereto and a second feed line connected to the combustor to feed a synthesis gas mixture thereto for combustion with the compressed air to produce nitrogen and water vapor. The nitrogen producing means also includes a condensor which is connected to the combustor to receive a flow of nitrogen and water vapor and to condense the water vapor to water. Also, a trap is connected to the condensor to receive and separate the nitrogen from the water and a first line connects the trap to the synthesis gas line to deliver nitrogen from the trap to the gas line. Also, an ammonia/water separator is connected to the trap to receive and separate water and ammonia from the trap. This separator is also connected to the monothermal isotope exchanger in order to deliver the separated water thereto as well as to a product line to expel ammonia therefrom.

In accordance with the invention the apparatus also has a steam circuit for passing water to the condensor of the nitrogen producing means and a turbine downstream of the condensor for generating work upon passage of steam therethrough.

The monothermal isotope exchanger has a first exchange tower for a throughflow of the water and a first circuit for passing a deuterium containing vapor vehicle through the exchange tower in isotope exchange with the water in order to enrich the water with deuterium. Also, the exchanger has a second exchange tower for a throughflow of the synthesis gas mixture and a second circuit for passing a liquid vehicle through the second exchange tower in isotope exchange with the synthesis gas mixture in order to remove deuterium from the synthesis gas mixture while enriching the liquid vehicle with deuterium. Still further, the exchanger has a third exchange tower for counterflow of the vapor vehicle and liquid vehicle therein in isotope exchange relation in order to deplete the liquid vehicle of deuterium while enriching the vapor vehicle with deuterium. In one embodiment, the vapor vehicle is ammonia vapor while the liquid vehicle is liquid ammonia. In another embodiment, the vapor vehicle may be methylamine vapor while the liquid vehicle is liquid-methylamine.

These and other objects and advantages of the invention will become more apparent from the following detailed description and appended claims taken in conjunction with the accompanying drawings in which:

The drawing illustrates a flow diagram of an apparatus according to the invention.

Referring to the drawing, the apparatus for the production of ammonia and heavy water comprises a feed water line 1 in which a pump 2 is incorporated for pumping feed water into and through an exchange tower 3a of a monothermal isotope exchanger of the apparatus. As shown, the monothermal isotope exchanger has a circuit for passing a deuterium-containing vapor vehicle, such as ammonia vapor or methylamine vapor through the exchange tower 3a in isotope exchange with the water in order to enrich the water with deuterium. The vapor vehicle is circulated via a compressor 4 which is driven by an electric motor 4a and also passes through a further exchange tower 5 for purposes as described below.

A heavy water preparation system 6 is connected via a suitable pipe line to the exchange tower 3a in order to receive the deuterium-enriched water. This heavy water preparation system 6 is constructed in known manner in order to form heavy water which exits through a line 7. For instance, the system 6 includes an electrolyzer (not shown) in which the enriched water is dissociated, a condensor wherein the further deuterium-enriched water vapor present in the hydrogen is separated out and condensed, and a suitable rectification means wherein the separated enriched water is rectified in order to be concentrated to form heavy water. The oxygen which is evolved in the heavy water preparation system 6 exits through a line 8 whereas the hydrogen evolved is passed out of a pipe 9 to flow to a compressor 10 which is driven by an electric motor 10a.

The apparatus also includes an enriched water storage tank 11 which is connected to the exchange tower 3a in order to receive a flow of deuterium enriched water. The tank 11 is also connected via a line containing a valve 12 and a pump 13 with an electrolyzer 14 of known construction. The electrolyzer 14 is also connected via a line 1' containing a valve 1" to the feed water line 1 in order to selectively receive fresh feed water.

The electrolyzer 14 is also connected to a hydrogen storage tank 15 via a compressor 18 which is driven by a motor 18a and a valve 19 between the compressor 18 and the tank 15. Also, the electrolyzer 14 has a line 17 from which oxygen which is evolved during a dissociation step exits, for example to a load (not shown).

The apparatus also has a synthesis circuit which includes a synthesizing plant 16 for receiving a synthesis gas mixture to produce ammonia. The outlet of the synthesizing plant 16 is connected to a cooler 20 in the synthesis circuit in which the produced ammonia is condensed via a heat exchanger supplied with a suitable coolant. In addition, a branch line 21 is provided for drawing off a quantity of an unsynthesized gas mixture from the synthesis circuit.

The apparatus further includes a nitrogen producing means for generating a flow of nitrogen for delivery to the synthesis circuit. This means includes a combustor 22, or other combustion facility, which connects with the line 21 from the synthesis circuit to receive the unsynthesized gas mixture as well as with a feed line 24 through which air is pumped under pressure via a compressor 23. The combustor 22 operates to burn the unsynthesized gas mixture in the compressed air and so to produce a hot combustion gas mixture consisting mainly of water and nitrogen with some argon and small traces of ammonia.

The outlet of the combustor 22 connects with two series-arranged coolers 25, 26 in which the gaseous mixture is cooled and the water and ammonia completely condensed. A trap 27 is connected to the outlet of the coolers 25, 26 to receive and separate the liquified water and ammonia from the nitrogen vapor. This trap 27 connects via a pipeline 28 to an ammonia/water separator 29 of known construction in which liquid ammonia can be removed via an outlet line 30 while deuterium depleted water can be removed and supplied to an exchange tower 3b in the monothermal isotope exchanger. The trap 27 is also connected via a line 36 to a synthesis gas piping to deliver the separated nitrogen thereto. The synthesis gas piping is also connected with the hydrogen storage tank 15 to receive hydrogen and includes a compressor 34 for compressing the synthesis gas mixture consisting mainly of nitrogen and hydrogen prior to delivery to an exchange tower 38 of the monothermal isotope exchanger.

A branch line 37 is also connected to the line 36 to draw off some nitrogen to prevent argon from accumulating in the synthesizing plant 16.

The exchanger tower 38 is connected via a suitable line to a drip separator 39 which, in turn, is connected via a line to a compressor 35. The compressor 35 comunicates with the ammonia synthesizing plant 16 in which the synthesis gas mixture is synthesized into ammonia. The outlet of the synthesizing plant 16 is connected via the cooler 20 with a pipe for passing the condensed ammonia through the drip separator 39 and out a product line 40.

The first cooler 25 in the flow of the hot combustion gases from the combustor 22 is connected with a steam circuit which includes a steam turbine 31, a condensor 32 and a pump 33. The steam turbine 31 serves as the power unit for the compressor 23 providing combustion-supporting air, for the compressor 34 in the synthesis gas piping and for the compressor 35 in the synthesis circuit. These compressors 23, 34, 35 therefore, do not have to be driven electrically. As a result, there is an appreciable saving in electricity consumption, an important cost consideration particularly during the winter.

Since the water fed into the tower 3b has a deuterium concentration considerably below the natural deuterium concentration (1 N), the water supplied to the heavy water preparation plant 6 is more deuterium enriched than would be the case if the monothermal isotope exchanger were to be supplied solely with water of a natural deuterium concentration. Consequently, a comparatively greater amount of heavy water can be produced in the system 6 for a given power consumption.

As shown in the drawing, the exchanger tower 38 cooperates with a circuit for passing a liquid vehicle through the tower 38 in isotope exchange with the synthesis gas mixture in order to remove deuterium from the synthesis gas mixture while enriching the liquid vehicle with deuterium. This circuit includes a valve 41 for controlling the throughflow of the liquid vehicle and a pump 42 for pumping the vehicle through the tower 38. In addition, the liquid vehicle is pumped through the exchange tower 5 in counterflow to the vapor vehicle described above so as to bring about an isotope exchange relation between the two vehicles in order to deplete the liquid vehicle of deuterium while enriching the vapor vehicle with deuterium.

In operation, e.g. during the summer warmer half of a, the apparatus operates as follows.

Fresh water having a natural deuterium concentration (1 N) is fed into the system through the feed water line 1. The pump 2 pressurizes the water to the pressure required in the monothermal isotope exchanger, thereafter the water flows through the exchanger tower 3a. The water is then enriched with deuterium in the tower 3a by deuterium exchange with the vapor vehicle circulating through the towers 3a, 5.

A portion of the enriched water then enters the heavy water preparation plant 6 and is concentrated to form heavy water in known manner. The heavy water then leaves the plant 6 via the line 7 while oxygen leaves via the line 8 and hydrogen leaves via the line 9. The hydrogen is then compressed to the required pressure in the compressor 10 and passed into the synthesizing gas piping.

The remainder of the water which has been enriched in the tower 3a, such remainder being considerably greater than the quantity of water ejected into the heavy water preparation plant 6, passes to the water storage tank 11. During the summer, the valve 12 is opened so that the water is pumped via the pump 13 to the electrolyzer 14. While the electrolyzer 14 is operating, fresh water is also fed in via the line 1', assuming the valve 1" is opened.

The oxygen which is evolved in the electrolyzer 14 is then passed through the line 17 and supplied to a load (not shown) while the hydrogen is compressed in the compressor 18 and fed into the hydrogen storage tank 15 through the opened valve 19. A part of this hydrogen is then passed into the synthesis gas line to the compressor 34.

The quantity of nitrogen required for the ammonia synthesis plant is produced continuously throughout the year. In this regard, after synthesized ammonia has been condensed out in the cooler 20 downstream of the synthesizing plant 16, an unsynthesized gas mixture consisting mainly of nitrogen, hydrogen and argon traces and residues of ammonia is removed via the line 21 from the synthesis circuit. This mixture is then fed through the line 21 to the combustor 22 along with air which is compressed by the compressor 23 and supplied through the line 24. During combustion which occurs as is known in an at least partially catalytic manner, a hot combustion gas mixture is produced. This mixture consists mainly of water vapor and nitrogen. The combustion mixture also contains argon and small traces of ammonia. The mixture is cooled in the coolers 25, 26 via a a heat exchange and the water and ammonia are completely condensed. The liquified water and ammonia proportion of the mixture is then separated in the trap 27 from the mixture which contains nitrogen, argon and, possibly, still traces of water vapor and ammonia in vapor form and passes through the line 28 to the ammonia/water separator 29. Liquid ammonia is removed from the separator 29 through the line 30 whereas the deuterium-depleted water is supplied to the tower 3b of the monothermal isotope exchanger.

The nitrogen produced for ammonia synthesis in the combustion facility 22 goes from the trap 27 through the line 36 into the synthesis gas circuit. Some nitrogen is removed from the system through the line 37 to prevent argon from accumulating in the synthesizer to an unwanted extent. This inert gas bleed, which consists mainly of nitrogen and argon, can be used for other purposes.

The synthesis gas consisting mainly of hydrogen and nitrogen is compressed in the compressor 34 (driven by turbine 31) and passes to the isotope exchange tower 38 of the monothermal isotope exchanger along with the hydrogen supplied from the heavy water preparation plant 6. The resultant synthesis gas mixture is then deuterium-depleted in the tower 26 by isotope exchange with the liquid vehicle, for example, liquid ammonia or liquid methylamine and is then introduced into the drip separator 27. The gas mixture is then pumped via the compressor 28 into the synthesizing plant 16. The ammonia which is produced is then condensed in the cooler 20 and leaves the system through a product line 40.

After deuterium enrichment in the tower 38, the liquid vehicle is expanded in the throttle valve 41, thereafter deuterium-depleted in the exchange tower 5 by isotope exchange with the vapor vehicle and thereafter pumped by the pump 42 to the correct operating pressure for the tower 38 and again deuterium-enriched therein.

The operation of the apparatus during the winter (i.e. the colder half of a year is as follows.

First, the valve 1" in the line 1' to the electrolyzer 14 is closed, the valve 12 from the water storage tank 11 is closed and the valve 19 to the hydrogen storage tank 15 is closed. Also, the electrolyzer 14 is deactivated.

Thereafter, all of the feed water in the line 1 passes through the exchange tower 3a and is deuterium enriched. A portion of the deuterium-enriched water is then passed to the heavy water preparation plant 6 while a second portion of the enriched water is passed into the water storage tank 11 for storage purposes. The tank 11 is filled up with enriched water in the amount necessary to produce the quantity of hydrogen which is stored in the tank 15 during the next summer.

The nitrogen required for the synthesizing plant 16 is produced as above and delivered via the line 36 into the synthesis gas line along with the hydrogen which was stored the previous summer in the tank 15. The synthesis gas mixture is then compressed in the gas compressor 35 and passed into the exchange tower 38 along with the hydrogen from the heavy water preparation plant 6. Operation then proceeds in the synthesizing plant 16 as described above.

It is to be noted that during the six summer months, the electrolyzer 14 operates to produce twice the amount of hydrogen by dissociation from enriched water, required by the ammonia synthesizing plant 16 in a six month period.

Further, during the summer, an equal quantity of water from the water storage tank 11 is dissociated in the electrolyzer 14 as is fed into said storage tank from the tower 3. For starting the synthesizing plant 16 it is necessary to start the compressors 23, 34 and 35 first. For doing that an oil-fired start-up boiler (not shown) may supply steam to the turbine 31. Said boiler may be replaced by an start-up electrical motor (likewise not shown) driving the shaft of the compressors.

What is claimed is:

1. A process for the production of ammonia and heavy water, said process comprising the steps of
    enriching a flow of water with deuterium in a monothermal isotropic process;

supplying a first portion of the deuterium-enriched water to a heavy water preparation plant to produce heavy water and hydrogen;

storing a second portion of the deuterium-enriched water substantially without interruption during the colder half of a year;

electrolytically dissociating the stored deuterium-enriched water substantially without interruption during the warmer half of a year to form hydrogen;

storing a portion of the electrolytically-produced hydrogen during said warmer half of a year while supplying the remainder to a synthesis circuit of a synthesizing plant and subsequently supplying the stored hydrogen to the synthesis circuit during said colder half of a year;

removing some of the synthesis gas mixture from the synthesis circuit of the synthesizing plant;

burning the removed synthesis gas mixture with air to produce a mixture consisting mainly of water and nitrogen;

thereafter condensing and separating the water from the mixture of water and nitrogen;

supplying the nitrogen of the mixture of water and nitrogen, the hydrogen from the heavy water preparation plant and the electrolytically-produced hydrogen to the synthesis circuit of the synthesizing plant to produce ammonia; and collecting deuterium-depleted water resulting from said burning step and feeding the collected deuterium-depleted water into the monothermal process.

2. A process as set forth in claim 1 which further comprises the steps of generating steam with the heat resulting in said burning step;

subsequently expanding the steam to supply mechanical power for compressing the air and synthesis gas supplied to the synthesis circuit.

* * * * *

UNITED STATES PATENT AND TRADEMARK OFFICE
CERTIFICATE OF CORRECTION

PATENT NO. : 4,213,953

DATED : July 22, 1980

INVENTOR(S) : Charles Mandrin

It is certified that error appears in the above—identified patent and that said Letters Patent is hereby corrected as shown below:

Column 5, line 5, after "a" insert -- year --.

Column 6, line 26, after "year" insert -- ) --.

Signed and Sealed this

Second Day of December 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,213,953
DATED : July 22, 1980
INVENTOR(S) : Charles Mandrin

It is certified that error appears in the above—identified patent and that said Letters Patent is hereby corrected as shown below:

Column 2, line 11, change "operation" to -- concentration --.

Signed and Sealed this

Tenth Day of February 1981

[SEAL]

Attest:

RENE D. TEGTMEYER

Attesting Officer

Acting Commissioner of Patents and Trademarks